Feb. 16, 1943.  S. LANDELL  2,311,400
MIRROR
Filed Nov. 12, 1940
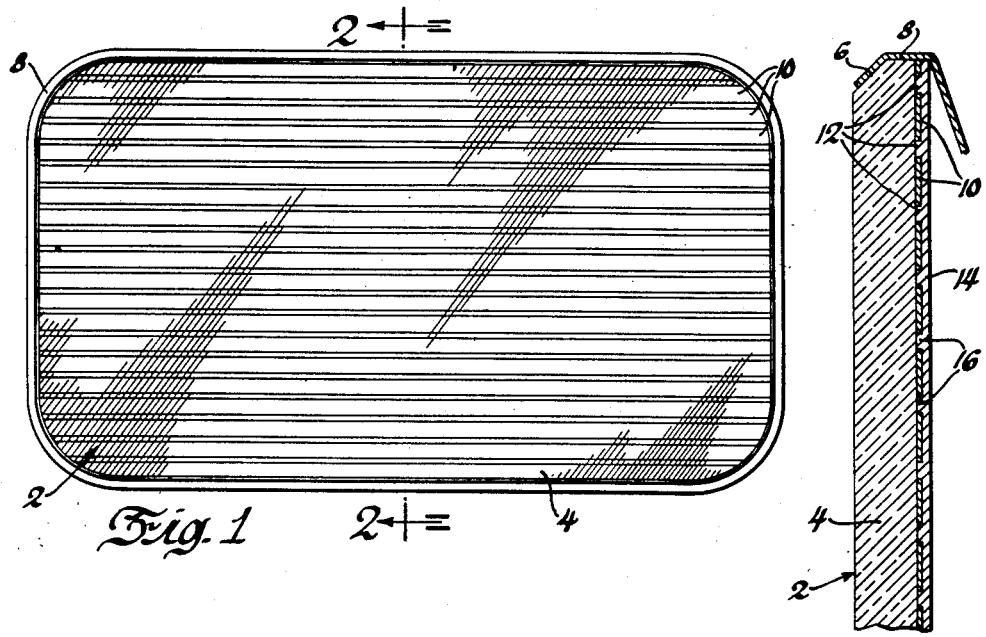
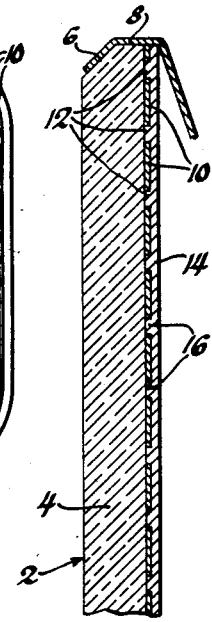
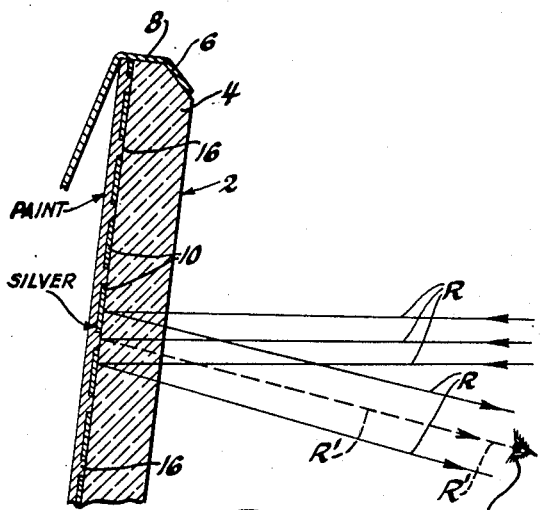
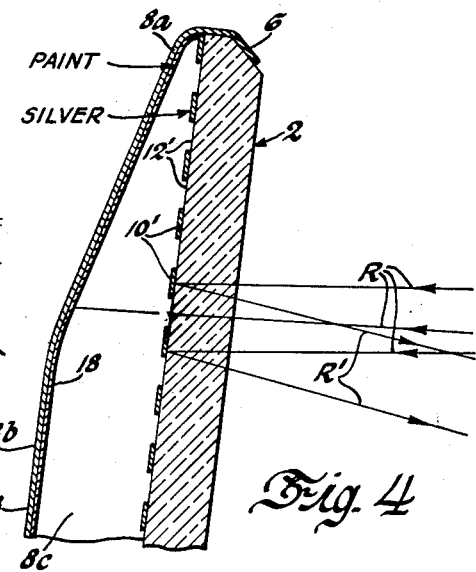
Inventor
Stanford Landell
By Blackmore, Spencer & Hind
Attorneys Patented Feb. 16, 1943

2,311,400

UNITED STATES PATENT OFFICE 2,311,400

MIRROR

Stanford Landell, Grosse Pointe Farms, Mich., assignor to General Motors Corporation, Detroit, Mich., a corporation of Delaware Application November 12, 1940, Serial No. 365,161

7 Claims. (Cl. 88—77)

This invention relates to mirrors and has particular reference to the rear view mirrors used on automotive vehicles.

The object of the invention is to construct a mirror which will eliminate a considerable portion of the glare which results from the lights of the following vehicle, particularly when the following vehicle is using the high beam or bright lights. With the ordinary mirror, it is well-known that when the lights of the following car are especially bright, there is a glare which strikes the operator's eyes, which at times is extremely annoying. With the mirror of the present invention, a considerable part of the brightness or glare is eliminated.

The object of the invention is accomplished by providing a surface at the rear of the mirror composed of spaced silvered or reflecting stripes, leaving therebetween a surface about one-third of the width of the stripes which is covered with a black paint or substance. The mirror then comprises alternate stripes of silver and black paint with the silvered surface about three times the size of the painted surface.

As an optional construction, the alternate non-silvered stripes may be left plain or of glass. There can then be applied a light absorbing material or substance on the inside face of the case or frame in which the mirror is mounted. This light absorbing material or substance may be black felt, flock, or flat black photographic non-reflecting paint.

On the drawing

Figure 1 is a front elevational view of the novel mirror.

Figure 2 is an enlarged sectional detailed view on the line 2—2 of Figure 1.

Figure 3 shows the mirror as it is applied to the automobile with direction lines indicating the path of rays of light coming from the headlamps of the following vehicle to the eye of the driver.

Figure 4 is a view of a modification in which the back of the mirror has no paint or other opaque material applied to the glass between the silvered stripes.

On the drawing, the numeral 2 indicates a rear view mirror as a whole. This mirror has the glass 4 having the beveled edge 6 therearound in order that it may be held in a frame 8.

To the rear of the mirror there are applied the silver stripes or surfacings 10 or, if desired, the entire rear of the mirror may be silvered and a portion of the silvered surface later removed to leave the spaces 12 therebetween. The spaces 12 are about one-third the width of the silvered stripes 10. Over the back of the mirror there is then applied the black paint or other adherent substance 14 which not only covers and protects the silvered surfaces 10 but also adheres to the glass 4 to form the blackened stripes 16 which alternate with the silvered stripes 10.

By providing the blackened stripes 16 there is reduced in a large measure the amount of reflecting surface of the mirror, and where the rays R of light from the following vehicle pass through the rear window and strike the mirror 2, there will be substantially no light reflected from the surfaces 16 and the light will be thrown back from the silvered surfaces only. This reflected light indicated at R' strikes the eye E and will be diminished to the extent of the width of the blackened surfaces 16. In other words, the dotted ray R' will throw no light back into the eyes of the observer.

Figure 4 shows a modification of the invention. In the figure the silvered stripes at the rear of the mirror 2 are indicated at 10'. The silvered stripes are shown as being of substantially the same width as the non-silvered stripes 12' although the relative size of the stripes may be the same as shown in Figure 3, or stripes of any suitable width may be used. The rear of the silvered stripes 11' are also preferably given a coating of a suitable protective paint.

Because the stripes or glass surfaces 12' between the silvered stripes 10' have no coating applied thereto, the incident light rays R striking the stripes 12' will pass through the glass, as is shown by the center incident ray R in Figure 4. Because some of the incident light rays R are able to pass through the mirror, there will be no reflection or glare upon the eye E of the operator from these rays.

In order to absorb the incident rays R which pass through the mirror and through the stripes 12', the inside surface of the frame or case 8— in which the mirror 2 is mounted—has applied thereto an inner coating or surface of a suitable light absorbing material or substance such as black felt, flock, or flat black photographic non-reflecting paint. This surface is indicated by the numeral 18.

The back of the case or frame 8 may be inclined at its upper part as indicated at 8a, and if desired a similar part inclined toward the mirror may be used at the bottom of the case. There will be an intermediate part 8b which is flat and which joins the inclined parts. The sides of the case are indicated at 8c.

The interposition of the alternate blackened stripes 16, or the clear glass spaces 12' with the spaced dark surface 18, will not appreciably diminish the clarity of the general view through the rear window. It is of no particular importance that the image of the object at the rear of the vehicle be outstandingly clear and the blackened stripes 16 are not of such a character that they will prevent the operator of the vehicle from demarcating any ordinary object which it is necessary to see through the rear view mirror.

I claim:

1. In a rear view mirror for an automobile, a glass, a plurality of spaced narrow silvered stripes on the back of the glass, and a black stripe between each two adjacent silvered stripes, all of said stripes extending the full width of the mirror.

2. In a rear view mirror for an automobile, a glass, a plurality of equally spaced narrow silvered stripes on the back of the glass, and a black stripe between each two adjacent silvered stripes, all of said stripes extending the full width of the mirror.

3. In a rear view mirror for an automobile, a glass, a plurality of spaced narrow silvered stripes on the back of the glass, and a black stripe between each two adjacent silvered stripes, all of said stripes extending the full width of the mirror, said silvered stripes being substantially three times the width of the black stripes.

4. In a rear view mirror for an automobile, a glass, a plurality of spaced narrow silvered stripes on the back of the glass, and a coating of dark paint applied to the back of the stripes and the glass causing alternate stripes of the painted surface to be produced between the silvered stripes.

5. In a rear view mirror for an automobile, a glass, a plurality of spaced narrow reflecting stripes on the back of the glass, and a surfacing material on the back of the mirror producing non-reflecting stripes between each two adjacent reflecting stripes, all of said stripes extending the full width of the mirror.

6. In a rear view mirror for an automobile, a glass, a plurality of equally spaced narrow reflecting stripes on the back of the glass, and a surfacing material on the back of the mirror producing non-reflecting stripes between each two adjacent reflecting stripes, all of said stripes extending the full width of the mirror.

7. In a rear view mirror for an automobile, a glass, a plurality of spaced narrow reflecting stripes on the back of the glass, and a surfacing material on the back of the mirror producing non-reflecting stripes between each two adjacent reflecting stripes, all of said stripes extending the full width of the mirror, and being substantially the same width.

STANFORD LANDELL.